United States Patent
Stoller et al.

(10) Patent No.: US 11,500,637 B2
(45) Date of Patent: Nov. 15, 2022

(54) SOFTWARE INSTRUCTION SET UPDATE OF MEMORY DIE USING PAGE BUFFERS

(71) Applicant: Micron Technology, Inc., Boise, ID (US)

(72) Inventors: Scott Anthony Stoller, Boise, ID (US); Douglas Eugene Majerus, Boise, ID (US); Qisong Lin, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 127 days.

(21) Appl. No.: 16/902,009

(22) Filed: Jun. 15, 2020

(65) Prior Publication Data

US 2021/0389949 A1 Dec. 16, 2021

(51) Int. Cl.
*G06F 9/30* (2018.01)
*G06F 9/445* (2018.01)
*G06F 3/06* (2006.01)
*G06F 8/65* (2018.01)

(52) U.S. Cl.
CPC ........ *G06F 9/30181* (2013.01); *G06F 3/0604* (2013.01); *G06F 3/0659* (2013.01); *G06F 3/0673* (2013.01); *G06F 8/65* (2013.01); *G06F 9/445* (2013.01)

(58) Field of Classification Search
None
See application file for complete search history.

(56) References Cited

U.S. PATENT DOCUMENTS

| | | | |
|---|---|---|---|
| 7,523,149 | B1 | 4/2009 | Sridharan et al. |
| 9,147,486 | B2 | 9/2015 | Koudele |
| 10,140,040 | B1 | 11/2018 | Koudele et al. |
| 2007/0255920 | A1 | 11/2007 | Gold |
| 2008/0109612 | A1 | 5/2008 | Jones |
| 2012/0191964 | A1 | 7/2012 | Lee et al. |
| 2016/0232088 | A1 | 8/2016 | Mohan et al. |
| 2016/0306591 | A1 | 10/2016 | Ellis et al. |

(Continued)

FOREIGN PATENT DOCUMENTS

| | | |
|---|---|---|
| CN | 113805912 A | 12/2021 |
| KR | 20120125791 A | 11/2012 |

(Continued)

OTHER PUBLICATIONS

"International Application Serial No. PCT/US2020/051584, International Search Report dated Dec. 30, 2020", 3 pgs.

(Continued)

*Primary Examiner* — Scott C Sun
(74) *Attorney, Agent, or Firm* — Schwegman Lundberg & Woessner, P.A.

(57) ABSTRACT

Disclosed in some examples are methods, systems, devices, memory controllers, memory dies, memory devices, and machine-readable mediums that allow for efficient updating of software instructions of the memory die. In some examples, the controller of the memory device may cause the software instructions of one or more memory dies to be updated by causing the page buffers of the one or more memory dies to be loaded with updated software instructions and subsequently issuing a command to the memory die to update the software instructions from the page buffer.

20 Claims, 8 Drawing Sheets

(56) References Cited

U.S. PATENT DOCUMENTS

| | | |
|---|---|---|
| 2016/0342347 A1 | 11/2016 | Duzly et al. |
| 2018/0341553 A1 | 11/2018 | Koudele et al. |
| 2018/0373437 A1 | 12/2018 | Navon et al. |
| 2019/0004907 A1 | 1/2019 | Sela et al. |
| 2019/0065204 A1* | 2/2019 | Jean .................. G06F 9/30192 |
| 2019/0163597 A1 | 5/2019 | Shibamura |
| 2020/0073568 A1 | 3/2020 | Chaiken et al. |
| 2021/0089229 A1 | 3/2021 | Majerus et al. |

FOREIGN PATENT DOCUMENTS

| | | |
|---|---|---|
| KR | 20180000381 A | 1/2018 |
| WO | WO-2021061529 A1 | 4/2021 |

OTHER PUBLICATIONS

"International Application Serial No. PCT/US2020/051584, Written Opinion dated Dec. 30, 2020", 4 pgs.

U.S. Appl. No. 16/579,256, filed Sep. 23, 2019, Loading Media Settings From On-Media Locations in a Memory Sub-System.

* cited by examiner

SOFTWARE INSTRUCTION SET UPDATE OF MEMORY DIE USING PAGE BUFFERS

FIELD OF INVENTION

Embodiments pertain to memory devices. Some embodiments relate to propagating software instruction set updates to individual memory dies in use in an efficient manner.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others.

Flash memory is utilized as non-volatile memory for a wide range of electronic applications. Flash memory devices typically include one or more groups of transistors such as floating gate or charge trap memory cells that allow for high memory densities, high reliability, and low power consumption.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
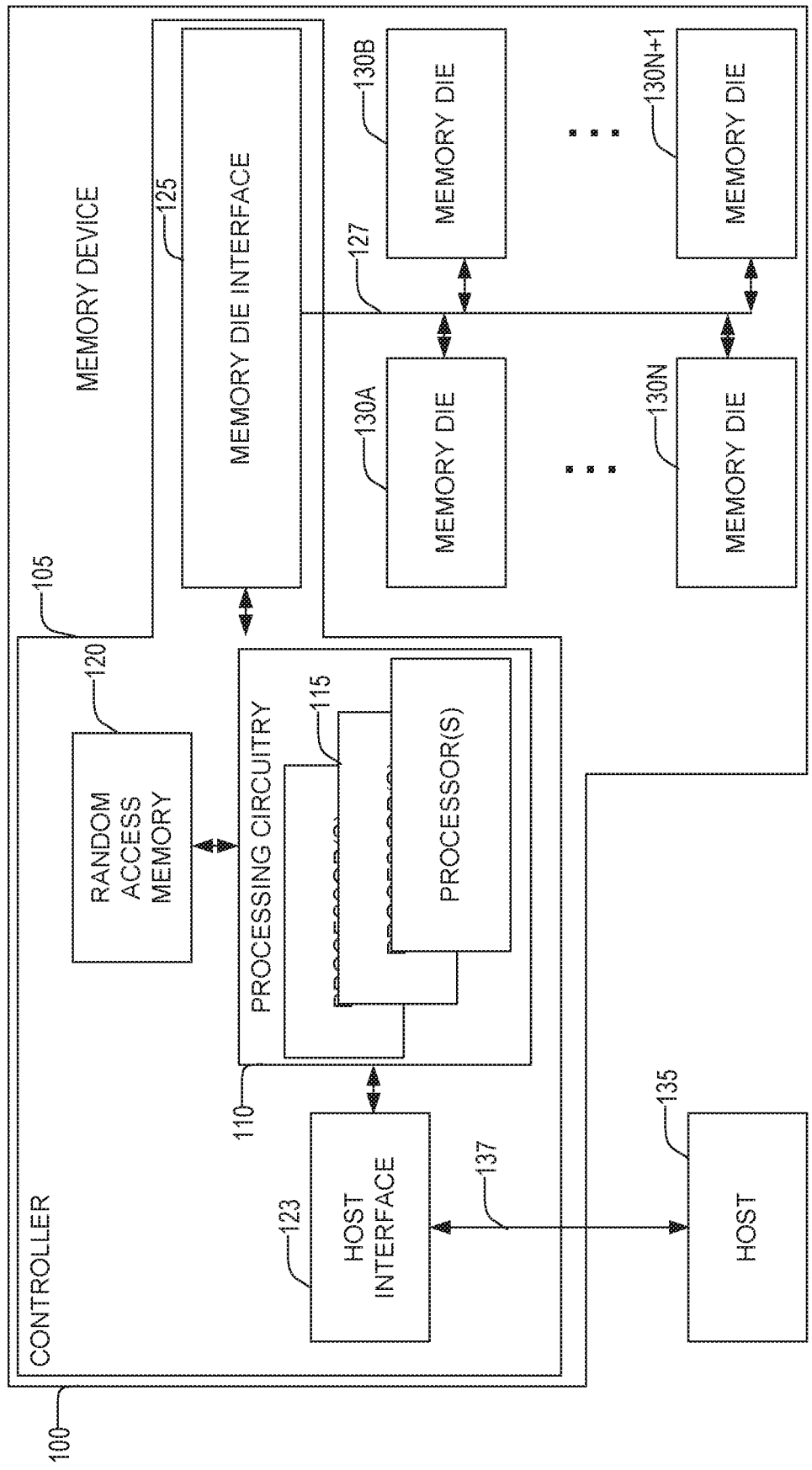
FIG. 1 illustrates a diagram of a memory device, such as a storage device according to some examples of the present disclosure.

Memory devices use one or more arrays of memory cells to store data. In addition to the array of memory cells, memory devices typically include additional circuitry for controlling operation of the memory array. Additionally, multiple memory devices may be controlled, at least in part through a single controller. For example, memory devices may be organized with a controller and a number of memory dies that include the transistor-based memory cells that store data. The memory dies often feature small hardware microprocessors that perform basic commands according to a set of one or more software instructions. For example, software in the form of microcode or firmware may translate instructions into sequences of detailed circuit-level operations that perform reads from the memory cells, writes to the memory cells, erases the memory cells, and the like.

The software instructions are loaded onto each memory die during manufacturing and may be stored in a special portion of the memory cells that make up each memory die called a NAND read only memory (ROM) block. At power on, the NAND loads the microcode from the array and into static latches.

Defects in the software instructions may escape from the manufacturer and make it into the field. These defects may cause performance and stability issues. Since the instruction sets are stored in a ROM, updating these instructions typically requires tools that are not available to end users. Even if the ROM code on the NAND could be modified, doing so outside of the validated production environment is considered dangerous. This microcode is responsible for the NAND die coming ready and has very strict data retention and read disturb requirements. An update that erases this info and reprograms it is very hard to validate outside of a controlled environment and can result in the die becoming permanently unresponsive. Thus, currently, NAND dies do not have a safe way to update the microcode instructions in the field.

Disclosed in some examples are methods, systems, devices, memory controllers, memory dies, memory devices, and machine-readable mediums that allow for efficient and safe updating of software instruction sets of the memory die. In some examples, the controller of the memory device may cause the software instructions of one or more memory dies to be updated by causing one or more page buffers of the one or more memory dies to be loaded with a updated software instruction sets and subsequently issuing a command to the memory die to update the software instruction sets from the updated software instruction sets stored in the one or more page buffers. In some examples, the old instruction sets are not overwritten in the ROM, but the instruction sets are updated (e.g., by the methods disclosed herein) by first allowing the NAND die to load the old instruction sets stored in ROM to the static latches, and then causing the static latches to be overwritten by the updated instruction sets provided by the controller. In some examples, this may be caused to occur every time the NAND is powered on—e.g., the controller causes the update of the instruction sets as part of or after initialization of the NAND die and/or the controller. In other examples, the ROM may be updated by the NAND die to store the new code. In still other examples, a register, pointer, or other marker is used to inform the NAND die upon boot, to load an instruction set that is not in the ROM, but is in a different location indicated by the register, pointer, or other marker.

This invention provides a workaround to the above mentioned problems with updating the instruction sets of the memory die. The ROM code, as programmed by the factory stays in place, guaranteeing that the die will come active, and then works with the controller to apply updates at power on. If something goes wrong, the controller is informed and has the ability to use different recovery methods in the firmware to recover. This trades a slight boot time reduction for increased reliability to provide a field update of the microcode. As noted, in some examples, the original microcode is maintained and loaded and then replaced with the update. If anything goes wrong, the update may be canceled by the controller such that operation returns to the factory default microcode.

As noted, example software instructions that may be updated by the methods disclosed herein include microcode, firmware, or other lower level software. However, one of ordinary skill in the art with the benefit of the present disclosure will appreciate that other software instructions may also be updated (if present on the memory die). For example, if the memory die were to execute higher level instructions (e.g., application-level instructions), the methods of updating the software instructions of the memory die may apply to updating those higher-level instructions as well.

Page buffers are allocated portions of Static Random Access Memory (SRAM) of the memory die that temporarily store data for doing operations such as program, erase, and read operations on the memory cells (e.g., NAND cells) of the memory die. The software instruction set update may be loaded into the page buffers in several different ways. For example, the memory device may issue a write command to write the software instruction set update to a memory location in the memory array (e.g., the NAND array) in the die. For example, a writeable portion of the die, or the like. By virtue of the write command, the write page buffer may store a copy of the software instruction set update—that is, before writing to the NAND array, the memory die may store the software instruction set update in the page buffer and the contents of the page buffer may not be immediately cleared after the write command is completed. If the controller desires to use the read page buffers, a read command may be issued for the previously written software instruction set update. The location of the page buffers on which the data is stored may be determined by the controller, e.g., through a request command, through a return value of the write (or read), or by virtue of the system design (e.g., the controller may know how page buffers are used by the memory die).

In other examples, the controller may be able to directly control the page buffers. For example, the controller may issue a command to have specific page buffers loaded with the software instruction set update. In these examples, the command to load the software instruction set update may include the software instruction set update as a payload in the command. In other examples, the command to load the software instruction set update into the page buffers may specify a location in the memory array on the memory die. That is, the controller first wrote the software instruction set update to a location on the memory die and then issued a command to load the page buffer with data stored at that location.

Once the software instruction set update is loaded into the page buffers, the firmware of the controller may then issue a command to have the software instruction set update updated. The command may specify the page buffers to use that contains the software instruction set update. The memory die may then update the software instruction set (e.g., the microcode). In some examples, an entirely new software instruction set may be loaded. In yet other examples, specific instructions in the set may be updated. The software instruction set update stored in the page buffers may include an offset within the current instruction set and one or more replacement instruction(s). The memory die may replace the instructions at the offset with the replacement instructions.

In some examples, the memory dies load the updated instruction sets into one or more latches to apply the updated software instruction sets. As previously described, the instruction sets programmed at the factory may be stored in a static ROM location of the memory die. In some examples, updating the instruction sets may occur after the factor programmed instruction sets are loaded. In these examples, loading the updated instruction sets into one or more latches may overwrite the instruction sets that may have been previously loaded from the static ROM (the instruction sets programmed at the factory). In other examples, loading the updated instruction sets into the latches may occur prior to the memory die loading the instruction set stored in the static ROM and thus the memory die loads the updated instruction sets without first loading the instruction sets stored in the static ROM.

In still other examples, a single command may be issued from the controller that includes the software instruction set update or a location of the software instruction set update in the memory array that is then interpreted by the memory die as a command to load the software instruction set update into the page buffers and then apply the update.

Disclosed in some examples are methods, systems, devices, memory controllers, memory dies, memory devices, and machine-readable mediums in which the memory device controller may update one or more other values of the memory die that are set at NAND initialization. For example, other information stored in the ROM blocks may be loaded into latches upon die initialization. This information may be updated in a similar manner to instruction sets. This information is loaded at initialization and may be updated by the controller (e.g., the firmware) in the same manner as instruction sets. For example, updating redundant columns (repaired columns) information regarding which NAND memory columns are swapped out for redundant columns (e.g., due to errors); redundant blocks (repaired blocks) information regarding which NAND memory blocks are swapped out for redundant blocks; block tagging (bad blocks)—information on which blocks are not functional to disallow the use of those blocks by customers; pagemap latches (logical to physical translation) that define the pagemap of the device—the physical wordline and/or superblock location of each logical page in a block; and the like. For example, these values may be set at the time of die manufacture. These values are examples and one of ordinary skill in the art with the benefit of the present disclosure will appreciate that other information may be updated in a same manner.

Memory Device Overview

As previously noted, flash memory is utilized as non-volatile memory for a wide range of electronic applications. Flash memory typically includes one or more groups of transistors such as floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Flash memory cells in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storage cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), or one of various forms of managed memory device. Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards such as JEDEC standard JESD223D, entitled "JEDEC UFS Flash Storage 3.0," and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, such as a "host" as discussed later herein. In such managed memory devices, the controller functionality may be implemented on one or more die also incorporating a memory array, or on a separate die). In other examples, one or more memory devices may be combined with controller functionality to form a solid-stage drive (SSD) storage volume. The term "memory system," is used herein as inclusive of one or more memory die, and any controller functionality for such memory die, when present; and thus, includes individual memory devices, managed memory devices, and SSDs.

For purposes of the present description, example embodiments include managed memory devices implementing NAND flash memory cells, termed "managed NAND" devices. Such managed NAND devices may be constructed and operated generally in accordance with the described JEDEC UFS Flash Storage 3.0 specification, as may be modified as appropriate to incorporate the structures and functionality described herein. However, the described functionality may be implemented with other types of memory devices, as described above, which may incorporate other storage technologies, a few non-limiting examples of which were discussed earlier herein; and may be configured for operation in accordance with other industry standards, as discussed above; or in accordance with non-industry standard protocols.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

FIG. 1 illustrates a diagram of a memory device 100, such as a storage device according to some examples of the present disclosure. Memory device 100 may include one or more host interfaces 123 which may utilize one or more protocols such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces to communicate with a host device 135. Host 135 may send one or more commands, such as read comments, write commands, erase commands, and the like to the memory device 100 through the host interface 123. Host interface 123 may be part of controller 105 or may be implemented by separate circuitry.

Memory device 100 may include one or more memory controllers 105. Controller 105 may include processing circuitry 110 which may include one or more hardware processors 115. Processors 115 may be general purpose hardware processors that execute firmware or other software instructions for performing operations of the memory device, including implementing the host interface 123 and memory die interface 125. In other examples, the processor(s) 115 may be special purpose hardware processors that are specifically designed to perform the operations of the memory device 100 through hardware logic and/or through the execution of software instructions. Processing circuitry 110 may also include logic circuits and other circuit components configured to perform various control functionality and memory management operations, or portions thereof, examples of which are described below.

In the depicted example, memory device 100 includes a host interface 123 providing communication through a host bus 137 to external host device 135. The configuration of host interface 123 may be of various forms depending upon the specific configuration of memory device 100 (which may also be termed a "memory system"). For example, in an example in which memory device 100 is a UFS device, the host interface will be in accordance with the applicable UFS standard.

Memory device 100 also incorporates one or more memory die interfaces 125 between the processing circuitry 110 of the controller 105 and at least some portion of the memory dies 130-A-130N+1 within memory device 100. Memory die interface 125 may be part of controller 105 or may be implemented by separate circuitry. For example, in the example of a UFS device, one or more of the memory die interfaces 125 will be a suitable memory interface, for example an Open NAND Flash Interface ("ONFI"), such as that defined by the ONFI 4.0 Specification, or later versions or revisions thereof.

Components of the memory device 100, such as controller 105, may include a random access memory (RAM) 120 for performing the operations of the memory device 100. The random access memory 120 may be separate from the controller 105 or, as shown, may be integrated in the controller 105.

Figure 4:
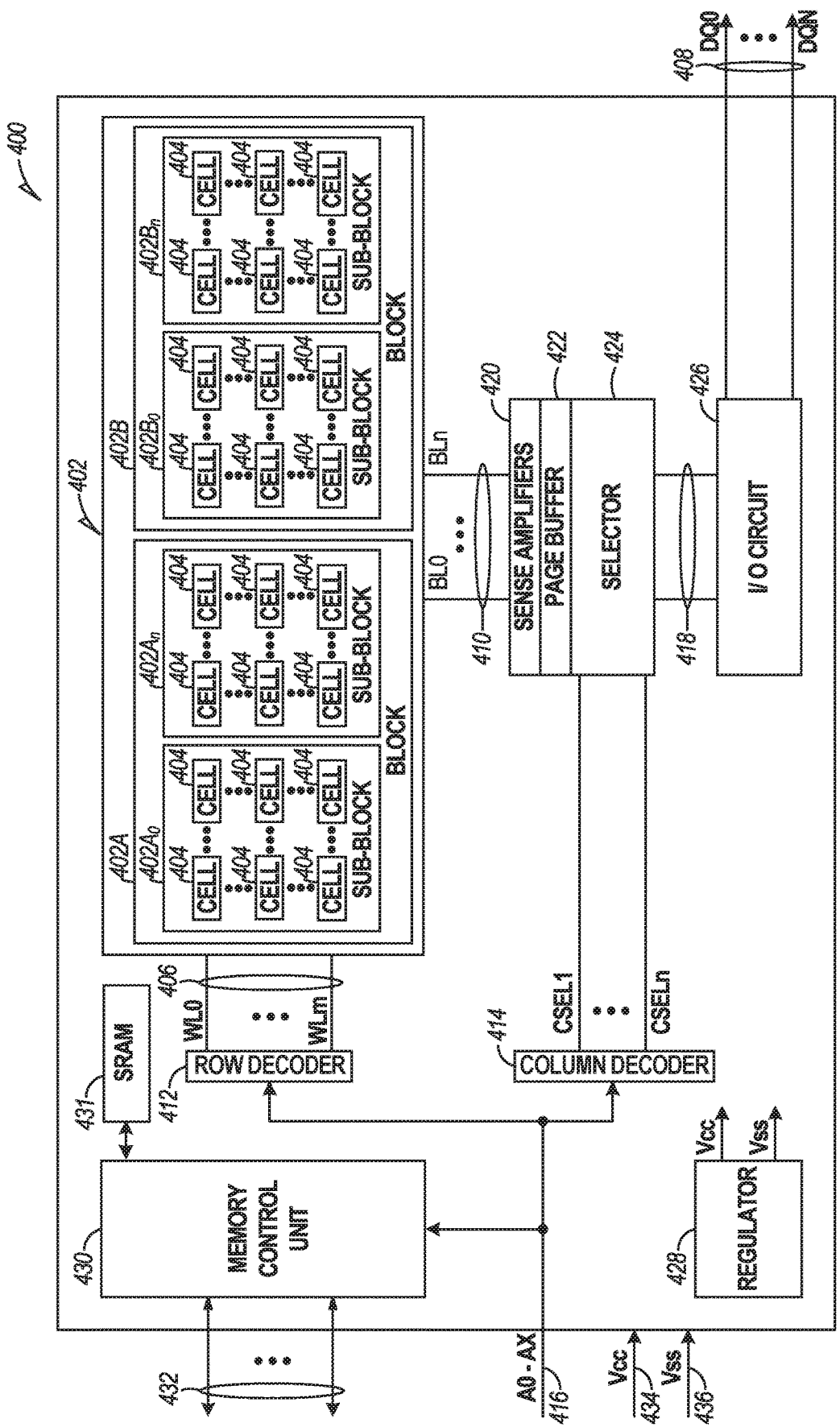
FIG. 4 illustrates an example block diagram of a memory die according to some examples of the present disclosure.

Controller 105 may handle one or more functions of the memory by interacting with the memory cells of the memory device that are part of one or more memory dies 130-A-130N+1. A schematic of an example implementation of a memory die 130 is shown in FIG. 4. The controller 105 may communicate with these memory dies through the memory die interface 125 across a memory die bus 127. In some examples, the memory dies may have their own device controllers, including processing circuitry and processors, to control operations on the respective memory die. Such device controllers may be formed on a common die with the device storage array or may be on a separate die from that containing the device storage array. Both configurations are embraced by the identified "memory die" (130A-N+1) described herein. Memory dies may be NAND dies, three-dimensional NAND dies, phase change memory dies, and the like.

The host device 135 may be a personal computer, a smartphone, a tablet, a portion of an integrated circuit, an Internet of Things (IoT) device (e.g., a refrigerator or other appliance, sensor, motor or actuator, mobile communication device, automobile, drone, etc.), or the like.

For purposes of the present description example memory operation and management functions may be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions.

The memory dies 130-A-130-N+1 can include several memory cells arranged in, for example, a number of planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the memory device 100 in pages and erased in blocks. However, one or more memory operations (e.g., read, write, erase, etc.) can be performed on larger or smaller groups of memory cells, as desired. The data transfer size of a memory device 100 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells can provide for different page sizes or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

Figure 2:
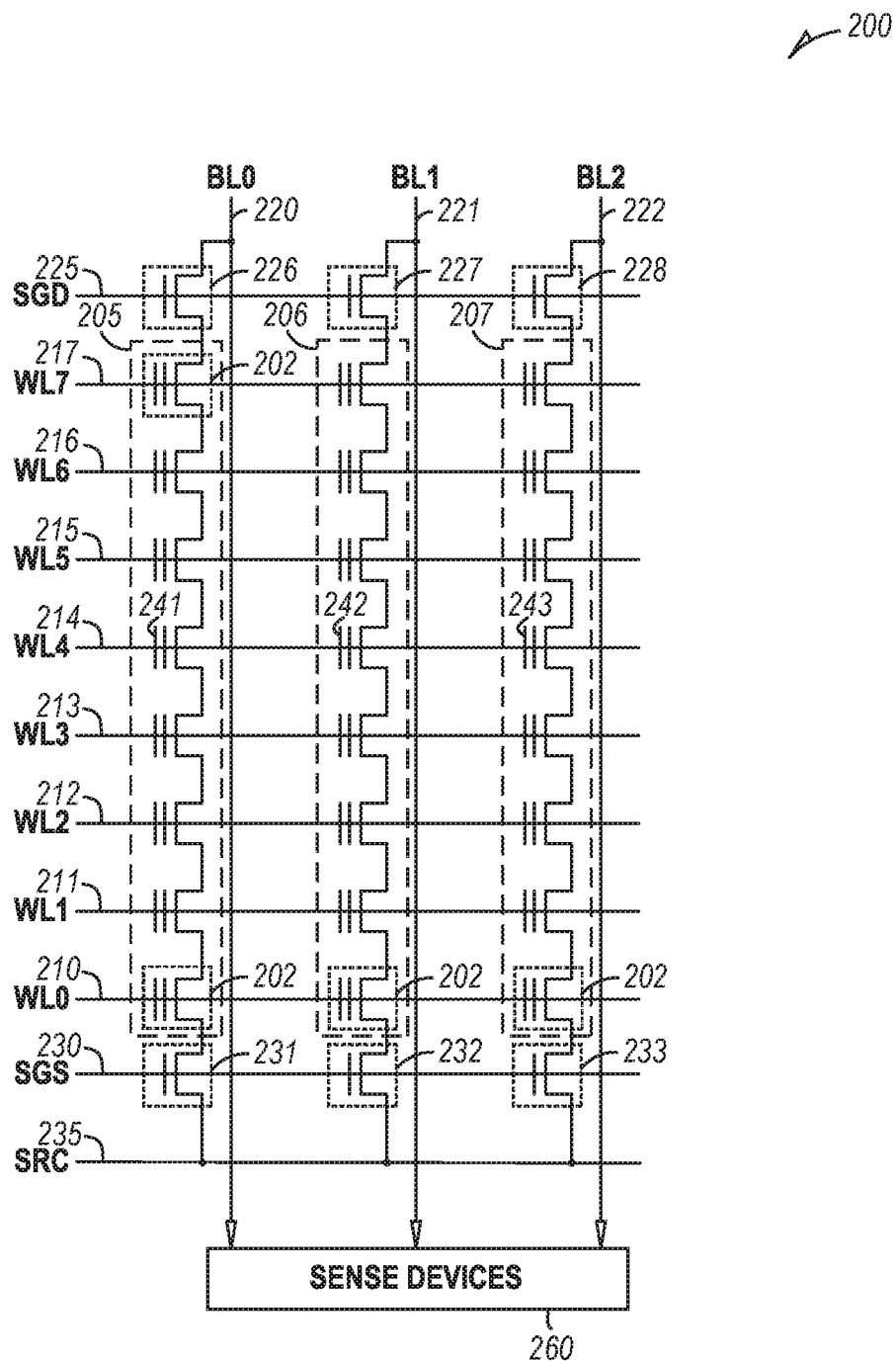
FIG. 2 illustrates an example schematic diagram of a portion of a NAND architecture semiconductor memory array according to some examples of the present disclosure.

FIG. 2 illustrates an example schematic diagram of a portion of a NAND architecture semiconductor memory array 300 including a plurality of memory cells 202 arranged in a two-dimensional array of strings (e.g., strings 205-207) and tiers (e.g., illustrated as respective word lines (WL) WL0-WL7 210-217, a drain-side select gate (SGD) line 225, a source-side select gate (SGS) line 230, etc.), and sense amplifiers or devices 260 according to some examples of the present disclosure. For example, the memory array 200 can illustrate an example schematic diagram of a portion of one physical page of memory cells of a memory die 130 from FIG. 1.

Each string of memory cells is coupled to a source line (SRC) 235 using a respective source-side select gate (SGS) (e.g., SGS 231-233), and to a respective data line (e.g., bit lines (BL) BL0-BL2 220-222) using a respective drain-side select gate (SGD) (e.g., SGDs 226-228). Although illustrated with 8 tiers (e.g., using word lines (WL) WL0-WL7 210-217) and three data lines (BL0-BL2 226-228) in the example of FIG. 2, other examples can include strings of memory cells having more or fewer tiers or data lines, as desired.

In a NAND architecture semiconductor memory array, such as the example memory array 200, the state of a selected memory cell 202 can be accessed by sensing a current or voltage variation associated with a particular data line containing the selected memory cell. The memory array 200 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., control gates (CGs) 241-243 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the charge storage structures of the targeted memory cells. Such charge storage structures may include, for example floating gates or charge trap regions of the respective memory cells. In floating gate memory cells charge is stored in an isolated polysilicon structure; while in charge trap memory cells the charge is typically stored in a dielectric structure.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the charge storage structures of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 260, coupled to one or more of the data lines (e.g., first, second, or third bit lines (BL0-BL2) 220-222), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

For Single Level Cells (SLC), there are two possible voltage levels programmed into the cell, one voltage level represents a binary '1' and another voltage level represents a binary '0' For Multi-Level Cells (MLC), there are four possible voltage levels programmed into the cell. The four possible voltage levels represent '00', '01', '10', and '11'. To program an MLC cell, multiple programming pulses are applied. A first pulse programs a first "page" of data that represents either the most significant bit or least significant bit of the cell. A second pulse programs the second "page" of data that represents the other bit of the cell that was not programmed by the first pulse. Similarly, Triple Level Cells (TLC) store eight possible voltage levels and Quad Level Cells (QLCs) store 16 possible voltage levels.

To read a value stored in one or more memory cells, a read voltage is applied to the wordline of the selected cells. If the voltage stored in the cells of the wordline is greater than the read voltage, the cell passes a voltage to the sense amplifier. For an SLC cell, the read voltage is selected to be between the two voltages representing a '1' and a '0.' For MLC, TLC, and QLC, multiple read operations are used to read each bit stored in the cell—each read operation utilizes a different read voltage.

To erase a memory cell or a group of memory cells (e.g., erasure is typically performed in blocks or sub-blocks), an erasure voltage (Vers) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the charge storage structures of the targeted memory cells to the channels.

Figure 3:
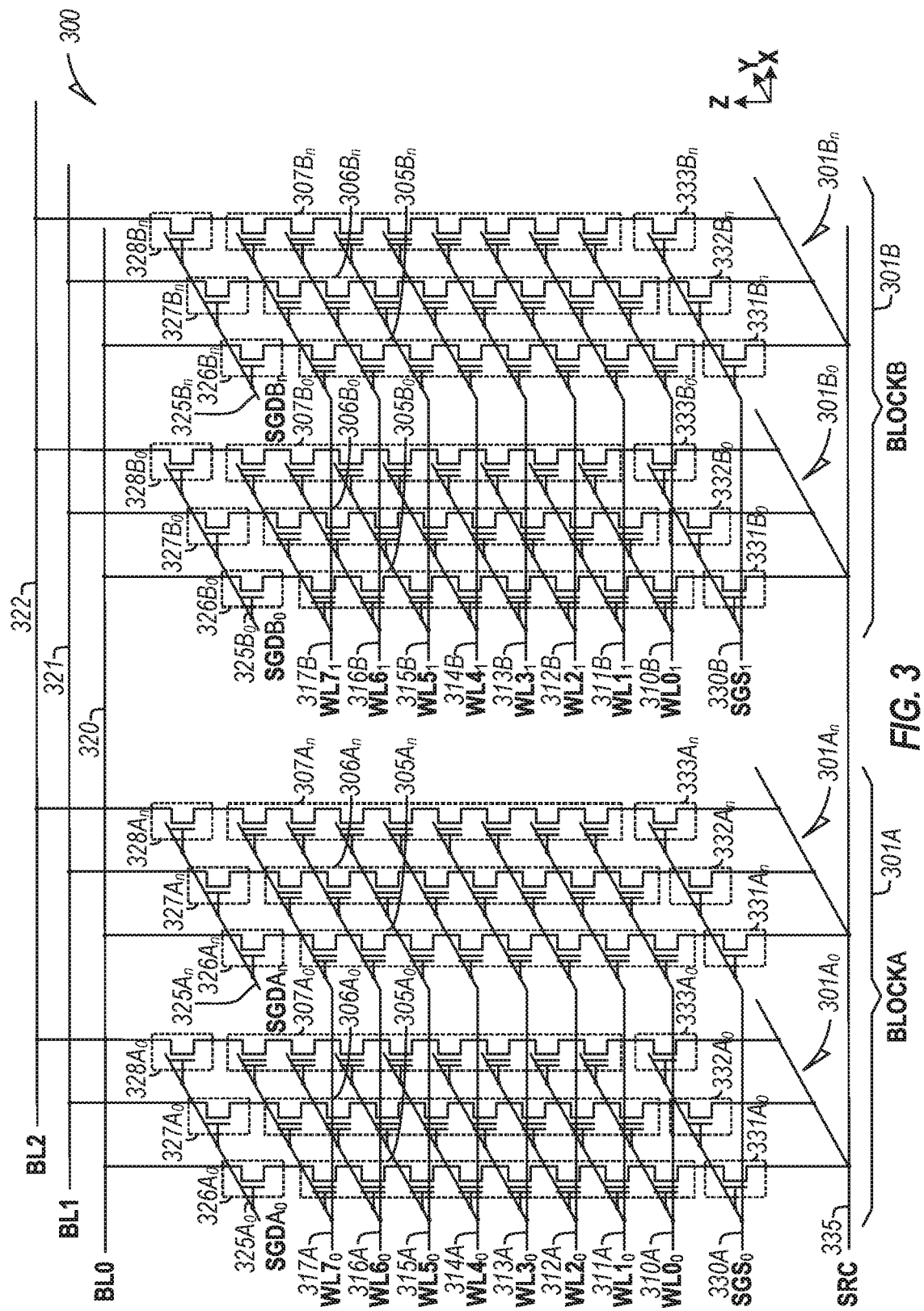
FIG. 3 illustrates an example schematic diagram of a 3D NAND architecture semiconductor memory according to some examples of the present disclosure.

FIG. 3 illustrates an example schematic diagram of a 3D NAND architecture semiconductor memory array 300 including a number of strings of memory cells (e.g., $A_0$ memory strings $305A_0$-$307A_0$, $A_n$ memory strings $305A_n$-$307A_n$, $B_0$ memory strings $305B_0$-$307B_0$, $B_n$ memory strings $305B_n$-$307B_n$, etc.), organized in blocks (e.g., block A 301A, block B 301B, etc.) and sub-blocks (e.g., sub-block $A_0$ 301$A_0$, sub-block $A_n$ 301$A_n$, sub-block $B_0$ 301$B_0$, sub-block $B_n$ 301$B_n$, etc.). The memory array 300 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 335 or a source-side select gate (SGS) (e.g., $A_0$ SGS $331A_0$-$333A_0$, $A_n$ SGS $331A_n$-$333A_n$, $B_0$ SGS $331B_0$-$333B_0$, $B_n$ SGS $231B_n$-$233B_n$, etc.) and a drain-side select gate (SGD) (e.g., $A_0$ SGD $326A_0$-$328A_0$, $A_n$ SGD $326A_n$-$328A_n$, $B_0$ SGD $326B_0$-$328B_0$, $B_n$ SGD $326B_n$-$328B_n$, etc.). Each string of memory cells in the 3D memory array can be arranged along the X direction as data lines (e.g., bit lines (BL) BL0-BL2 320-322), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 300 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 300 includes a control gate (CG) coupled to (e.g., electrically or otherwise operatively connected to) an access line (e.g., word lines (WL) $WL0_0$-$WL7_0$ 310A-317A, $WL0_1$-$WL7_1$ 310B-317B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, $A_0$ SGD $326A_0$-$328A_0$ can be accessed using an $A_0$ SGD line $SGDA_0$ $325A_0$, $A_n$ SGD $326A_n$-$328A_n$ can be accessed using an SGD line $SGDA_n$ $325A_n$, $B_0$ SGD $326B_0$-$328B_0$ can be accessed using an $B_0$ SGD line $SGDB_0$ $325B_0$, and $B_n$ SGD $326B_n$-$328B_n$ can be accessed using an $B_n$ SGD line $SGDB_n$ $325B_n$. $A_0$ SGS $331A_0$-$333A_0$ and $A_n$ SGS $331A_n$-$333A_n$ can be accessed using a gate select line $SGS_0$ 330A, and $B_0$ SGS $331B_0$-$333B_0$ and $B_n$ SGS $331B_n$-$333B_n$ can be accessed using a gate select line $SGS_1$ 330B.

In an example, the memory array 300 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

FIG. 4 illustrates an example block diagram of a memory die 400 according to some examples of the present disclosure. Memory die 400 may be one example of memory die 130A-130N+1 of FIG. 1. Memory die 400 may include a memory array 402 having a plurality of memory cells 404, and one or more circuits or components to provide communication with, or perform one or more memory operations on, the memory array 402. The memory die 400 can include a row decoder 412, a column decoder 414, sense amplifiers 420, a page buffer 422, a selector 424, an input/output (I/O) circuit 426, and a dedicated memory controller, in the form of memory control unit 430, including processing circuitry, potentially including one or more processors, as described earlier herein.

The memory cells 404 of the memory array 402 can be arranged in blocks, such as first and second blocks 402A, 402B. Each block can include sub-blocks. For example, the first block 402A can include first and second sub-blocks $402A_0$, $402A_n$, and the second block 402B can include first and second sub-blocks $402B_0$, $402B_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory die 400 according to one or more signals and/or instructions/commands received on control lines 432 at a memory interface with a memory controller (as described relative to controller 105 and host interface 123 of memory device 100 of FIG. 1. Such signals and/or instructions may include, for example, one or more clock signals and/or control signals that indicate a desired operation (e.g., write, read, erase, etc.), or address signals (A0-AX) received on one or more address lines 416. One or more devices external to the memory die 400 can control the values of the control signals on the control lines 432, or the address signals on the address line 416. Examples of devices external to the memory die 400 can include, but are not limited to, a host, a memory controller, a processor, or one or more circuits or components not illustrated in FIG. 4.

The memory die 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory die 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory die 400, such as a controller 105, can communicate with the memory die 400 using the I/O lines (DQ0-DQN) 408, address lines 416 (A0-AX), or control lines 432. The input/output (I/O) circuit 426 can transfer values of data in or out of the memory die 400, such as in or out of the page buffer 422 or the memory array 402, using the I/O lines 408, according to, for example, the control lines 432 and address lines 416. The page buffer 422 can store data received from the one or more devices external to the memory die 400 before the data is programmed into relevant portions of the memory array 402 or can store data read from the memory array 402 before the data is transmitted to the one or more devices external to the memory die 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418. In some examples a flash translation layer (not shown) can map addresses provided by a host to physical memory addresses used by the row decoder 412 and column decoder 414 to read data in the memory array 402.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

The Memory control unit 430 may utilize Random Access Memory (RAM) such as SRAM 431 to assist in performing operations to control the memory operations of the memory die 400. For example, the SRAM 431 may store one or more instructions, working values, and other calculations. The memory control unit 430 may execute software instruction sets, such as microcode which may reside on fully or partially on SRAM 431, within the memory control unit 430 (e.g., in dedicated registers, ROM, Flash, or other dedicated memory), within one or more memory cells (such as memory cells 404), or the like. SRAM 431 may store one or more page buffers that are used by the memory control unit 430 to temporarily store data being read from, or written to the memory cells (such as memory cells 404).

Software Instruction Set Update

As previously noted, the present disclosure allows for updating the software instruction set on a microprocessor of a NAND die. For example, the software instruction set of a memory control unit 430, I/O circuit 426, or the like from FIG. 4. As previously described a controller (such as controller 105) of the memory device may load the software instruction set update into page buffers of one or more memory dies (such as memory dies 130A-N+1 of FIG. 1, or memory die 400). Once the software instruction set update is loaded in one or more of the page buffers the memory device may issue an instruction for the memory die to update the software instruction set to the updated software instruction set.

In some examples, the memory die may perform an error detection and/or correction operation on the software instruction set update prior to updating. For example, the software instruction set update may include both the software instruction set update and an inverse of the software instruction set update. For example, if a byte of the software instruction set update is 01010101, the inverse is 10101010. The memory die may then check the software instruction set update by comparing it to the inverse of the inverse of the software instruction set update. If the inverse of the inverse is not equal to the software instruction set update, then there is an error. In other examples, the software instruction set update may be XOR'd with the inverse. If the result is all 1's, then the integrity check passes, otherwise the integrity check fails. The technique of including the software instruction set update and the inverse of the software instruction set update may be beneficial on memory devices, such as NAND devices, as errors on these devices tend to be in a same direction (e.g., ones transition to zeros, or zeros transition to ones, but the odds of a two bits flipping in opposite directions is low). Other integrity checks may be used, such as by sending redundant copies of the software instruction set update.

Errors that are found may cause an error message to be sent to the controller, or in other examples, the memory die may correct errors in the software instruction set. For example, by determining which bits do not match between the software instruction set and the inverse of the software instruction set. In other examples, the software instruction set update, as sent by the controller, may have one or more parity bits that are associated with the software instruction set update, such that the parity bits may be utilized to correct any bits that were received or stored in error. In other examples, the software instructions set update may have multiple copies, such that in the case where one copy contains an error the next copy may be used.

Figure 5:
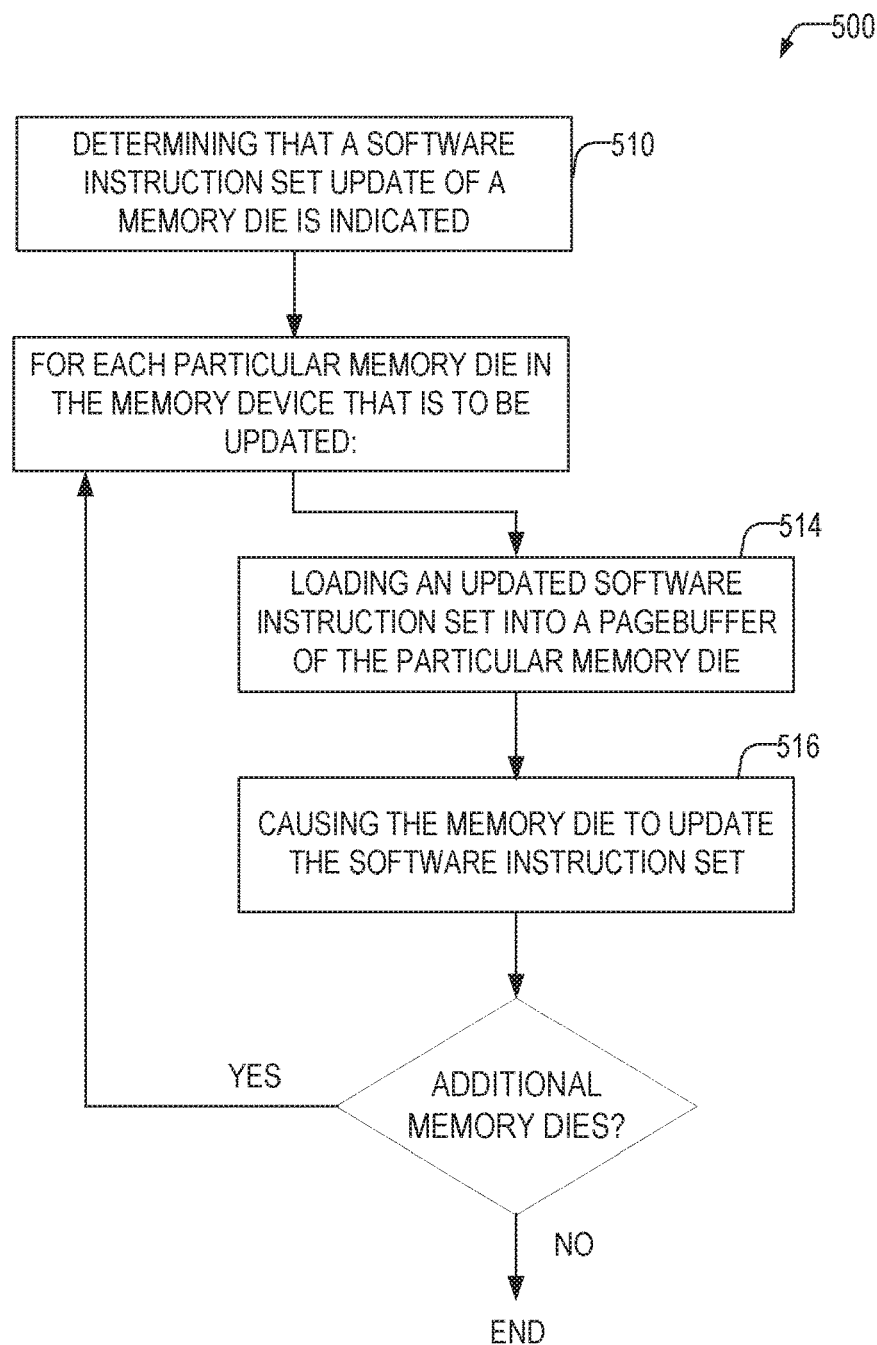
FIG. 5 illustrates a flowchart of a method of a controller updating a software instruction set of one or more memory dies according to some examples of the present disclosure.

FIG. 5 illustrates a flowchart of a method 500 of a controller updating a software instruction set of one or more memory dies according to some examples of the present disclosure. At operation 510 the controller may determine that an update of a software instruction set of one or more memory dies of the memory device is indicated. For example, a software instruction set update may be present in a firmware update for the controller. Upon applying the firmware update, the firmware update may include instructions for the controller to apply the software instruction set update to the memory die. In other examples, a software instruction set update may be separate from a firmware update (e.g., loaded to the firmware from a host using a dedicated command). In some examples, different die may have different software instruction set versions and only certain die may need to be updated. The controller may be able to query a software instruction set version from the memory die and determine which one or more memory die to apply the software instruction set update to. The software instruction set update may be applied to certain firmware versions (e.g., earlier versions).

For each particular die in the memory device that is to be updated, the controller may apply operations 514 and 516. At operation 514 the controller may cause the software instruction set update to be loaded into one or more page buffers of the particular memory die. At operation 516, the controller may issue a command that causes the memory die to update the software instruction set to the version in the one or more page buffers. The command may include a location of the software instruction set update in the one or more page buffers. For example, a specific page buffer, a specific range of page buffers, or the like. In some examples, the memory die may have multiple planes and each plane may have different page buffers. The command may include an identification of the set of page buffers (e.g., which planes page buffers contain the update). In addition, the software instruction set update may be spread out amongst multiple page buffers. For example, the software instruction set update may not fit on a single plane's page buffers. In these examples, the command may identify each page buffer that the software instruction set update is on. In some examples, the order of which to apply the software instruction set update may be predetermined (e.g., start at plane 0, next apply the software instruction set update from plane 1, and so on); in other examples, the order may be specified by the controller in the command. As noted, in some examples operations 514 and 516 may be a same operation in which the controller instructs the memory dies to both load the software instruction set update into the page buffers and apply the software instruction set update. The software instruction set update may be applied, in some examples, by overwriting static latches of a NAND die.

Operations 514 and 516 are repeated for each die that needs to be updated. In some examples, the controller may wait for a response indicating that the memory die has begun or is about to begin the software instruction set update before proceeding to the next memory die. In some examples, the controller may wait for a response indicating that the memory die has completed the update before moving onto the next die. In other examples, the controller may not wait until the memory die has completed the update before moving onto the next die in order to allow each die to update concurrently with each other—thereby improving parallelism of the software instruction set update.

In some examples, the memory die may send a message indicating whether the update succeeded or failed. For memory die that fail the update, the controller may retry the update or may perform one or more failure operations—such as sending a failure message to a host device. For one or more retry operations, the controller may load the software instruction set update to different page buffers, different memory cells on the die, or the like (e.g., the software instruction set update may have been corrupted by bad SRAM, a bad memory cell, or the like). In some examples, the retry may have additional error correction protection (e.g., additional parity bits) or the like. In some examples, if the software instruction set update was originally loaded to MLC, TLC, or QLC memory cells, the software instruction set update may be loaded to cells that store fewer bits per cell for the retry (e.g., SLC).

Figure 6:
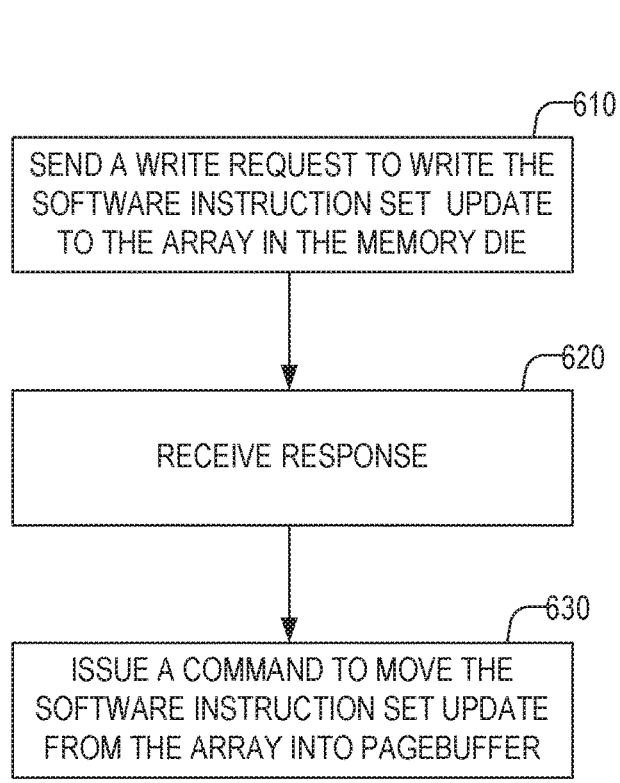
FIG. 6 illustrates a flowchart of a method of loading a software instruction set update into a page buffer of a memory die according to some examples of the present disclosure.

FIG. 6 illustrates a flowchart of a method 600 of loading a software instruction set update into a page buffer of a memory die according to some examples of the present disclosure. At operation 610 the controller sends a write request to write the software instruction set update into a memory location of the memory array of the memory die. For example, for NAND memory devices, the software instruction set update is stored on the NAND flash cells making up the NAND storage provided by the memory die. At operation 620, the memory die may provide a response indicating that the software instruction set update has been written. In some examples, there is no response and operation 620 may be omitted. In some examples, the controller may instruct the memory die on the physical address to store the software instruction set update. In other examples, the memory die may select a location and provide the location in the response. In some examples, as the memory die loads data into the page buffers in order to write the data, the page buffers may contain the software instruction set update by virtue of the executed write command. In these examples, the controller may instruct the die (e.g., at operation 516 of FIG. 5) to update the software instruction set from the page buffer without sending a command to move the software instruction set update to the page buffers at operation 630.

As previously noted the controller may know the proper page buffers based upon a response received by the memory die, a query made to the memory die by the controller (a response to the query providing the one or more page buffers), based upon knowledge that the controller has of how the page buffers are filled by the memory die, or based upon an explicit command (e.g., the write command may specify that a particular page buffer be loaded with the software instruction set update before being written to the NAND array), and the like.

In examples in which the controller doesn't know the page buffer location or does not trust that the software instruction set update is in the proper page buffer as a result of the write command, the controller may issue a command at operation 630 to move the software instruction set update from the memory cells to one or more page buffers. This may be a specific command that supplies specific page buffers or may be a read command in the case that the memory controller wishes to utilize read page buffers to load the software instruction set update. Again, for the read page buffers, the controller may know the proper page buffers based upon a response received by the memory die, a query made to the memory die by the controller (a response to the query providing the one or more page buffers), based upon knowledge that the controller has of how the page buffers are filled by the memory die, or based upon an explicit command (e.g., the command at operation 630 may specify that a particular page buffer be loaded with the software instruction set update before being written to the NAND array), and the like.

Figure 7:
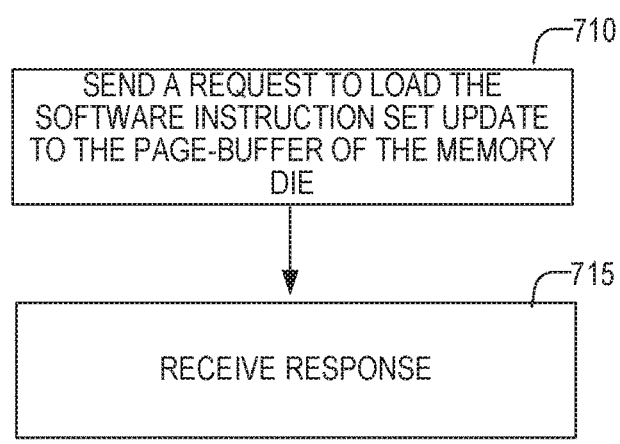
FIG. 7 illustrates a flowchart of a method of loading a software instruction set update into a page buffer of a memory die according to some examples of the present disclosure.

FIG. 7 illustrates a flowchart of a method 700 of loading a software instruction set update into a page buffer of a memory die according to some examples of the present disclosure. At operation 710 the controller may send a request to load the software instruction set update to the page buffer of the memory die. The request may include an identification of specific page buffers (or a starting page buffer) to load the software instruction set update into. At operation 715, once the response is received, then the update may be applied. At this point, the controller may issue a command to update the software instruction set (e.g., at operation 516 of FIG. 5).

As previously described, the update may be a whole update to the software instruction set, but in other examples, the update may update one or more portions of the software instruction set. For example, the payload of the software instruction set update may specify an offset into the current software instruction set from which the update overwrites. For example, the offset may be a number of bytes from the beginning of the present code and the software instruction set update may specify an instruction, or block of instructions that are to be inserted, or overwritten at that point.

As previously described, the page-buffers are loaded with the software instruction set update prior to updating. In other examples in which the software instruction set update is already loaded to the memory cells of the memory die, the page buffer may be loaded with an address of the software instruction set update in the memory cells of the memory die or the address may be provided in a command sent by the controller. In some examples, the memory die loads the instruction set update into the page buffers from the given address and applies the update. In other examples, the memory die may then load the software instruction set update directly from the memory cells without first transferring the software instruction set update to the page buffers.

In some examples, the memory die may have multiple planes per memory die. Each plane may have their own page buffers. Commands instructing the memory die to load a software instruction set update to the page buffers as well as commands instructing the memory die to apply the software instruction set update may specify the page buffers that are to be used (e.g., by supplying a plane number). In some examples, a location on the page buffers is also supplied. In some examples, the software instruction set update may be large enough that it is spread out across multiple page buffers of multiple planes. The commands may specify the particular planes and where in the page buffers of those planes that the software instruction set update is located. In some examples, the instruction set update may be large enough that it requires multiple operations to complete the load of the entire software instruction set. In some examples, where the software instruction set update is segmented across page buffers in multiple planes, an ordering of the segments may be provided to the memory die either by the controller or within the software instruction set update itself such that the memory die knows how to reassemble the segments in order.

In examples in which the software instruction set update is stored on the memory cells of the memory device prior to loading to the page buffer, the memory cells may be SLC cells in some examples. In other examples, the memory cells may be MLC, TLC, or QLC memory cells. In some examples, regardless of whether the memory cells are SLC, MLC, TLC, or QLC, additional error detection and correction coding may be applied to ensure the integrity of the software instruction set update prior to updating.

Figure 8:
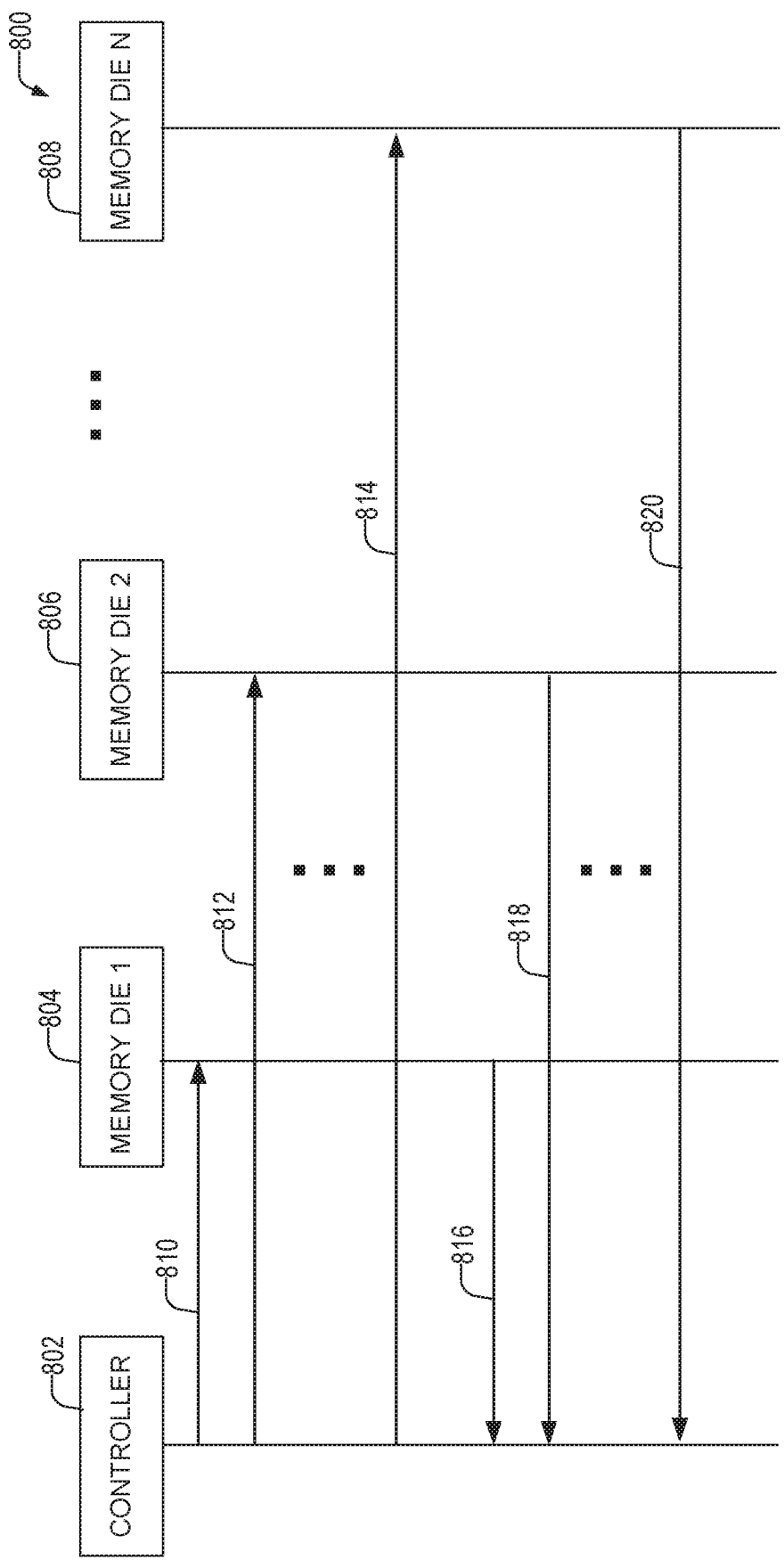
FIG. 8 illustrates a message sequence diagram of a process of updating a software instruction set on a plurality of memory dies in a memory device according to some examples of the present disclosure.

FIG. 8 illustrates a message sequence diagram 800 of a process of updating a software instruction set on a plurality of memory dies in a memory device according to some examples of the present disclosure. The message sequence diagram 800 illustrates a parallel method in which multiple memory die update their software instruction sets concurrently. Controller 802 sends one or more messages 810 to load a software instruction set update to and initiate an update on, memory die 1 804. Controller then sends one or more messages 812 to load a software instruction set update to and initiate a software instruction set update on, memory die 2 806. This process continues for memory dies that are not shown between memory die 2 806 and memory die N 808 until the last memory die that is to be updated—memory die N 808 is instructed using one or more messages 814. Each memory die 804 then begins to independently update the software instruction set on the memory die. That is, memory die 1 804 begins to update the software instruction set while controller loads and instructs other memory dies to update their software instruction sets and while other memory dies update their software instruction sets. That is, once instructed by the controller, the process of updating the software instruction sets on the memory dies is performed independently of other dies and can execute in parallel. Once memory die 1 804 is finished, it may send a status message 816 indicating success or failure of the update. Once memory die 2 806 is finished, it may send a status message 818 indicating success or failure of the update. Further status messages may be received for memory dies not shown between memory die 2 and memory die N. Once memory die N 808 is finished, it may send a status message 820 indicating success or failure of the update. Thus, even though the software instruction set update may be fairly large, the use of page buffers to store the update may allow parallel updating across memory dies.

As previously noted, the methods of FIGS. 5-8 may be used to update other information in the NAND die. For example, information loaded to latches such as updating redundant columns (repaired columns) information regarding which NAND memory columns are swapped out for redundant columns (e.g., due to errors); redundant blocks (repaired blocks) information regarding which NAND memory blocks are swapped out for redundant blocks; block tagging (bad blocks)—information on which blocks are not functional to disallow the use of those blocks by customers; Pagemap latches (logical to physical translation) that define the pagemap of the device—the physical wordline and/or superblock location of each logical page in a block; and the like. For example, these values may be set at the time of die manufacture. These values are examples and one of ordinary skill in the art with the benefit of the present disclosure will appreciate that other information may be updated in a same manner.

Figure 9:
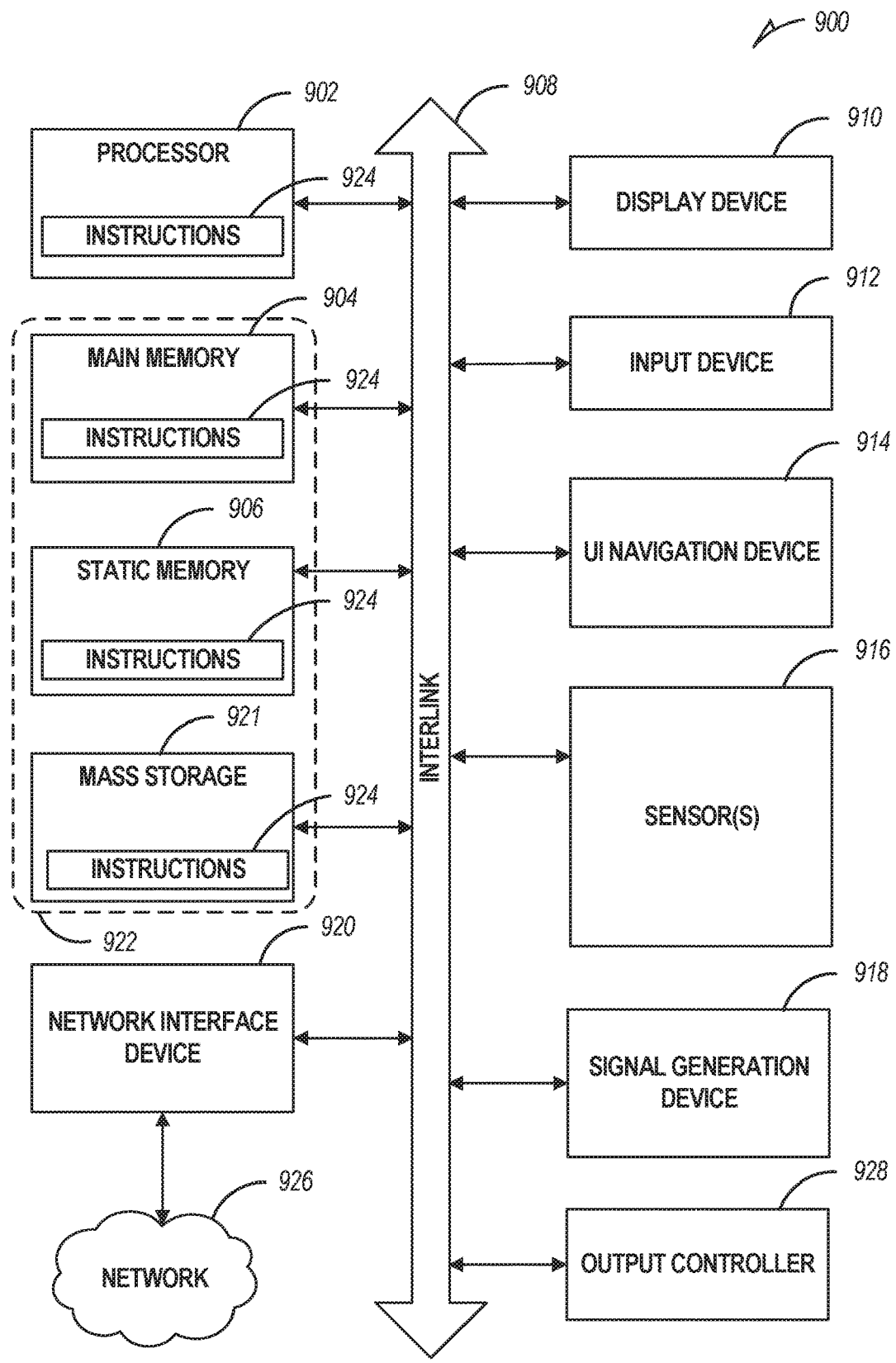
FIG. 9 illustrates a block diagram of an example machine upon which any one or more of the techniques (e.g., methodologies) discussed herein may be performed.

FIG. 9 illustrates a block diagram of an example machine 900 upon which any one or more of the techniques (e.g., methodologies) discussed herein may be performed. Machine 900 may be a host device (such as host device 135) wherein one or more of the memory units of example machine 900 (main memory 904, static memory 906, and/or storage device 921) may be implemented through memory implementing the techniques such as those discussed relative to FIGS. 1-8 herein. The various memory devices illustrated in FIGS. 1-8 may include one or more components of machine 900. For example, the processor 902 may be an example of processors 115 of FIG. 1; main memory 904; static memory 906 may be an example of random access memory 120. Storage device 921 (e.g., mass storage) may be an example of memory die 130A-130N of FIG. 1. Interlink 908 may be an example of memory die bus 127; network interface device 920 may be an example of host interface 123; and so on. Other components shown on machine 900 may be included on memory device in some examples, or may not be included on the memory device in other examples.

In alternative embodiments, the machine 900 can operate as a memory device in host, a standalone memory device, a standalone host device or can be a connected computing device (e.g., a host that is networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a memory device; a host device—such as a personal computer (PC), a tablet PC, a set-top box (STB), a personal digital assistant (PDA), a mobile telephone, a web appliance, an IoT device, automotive system, or the like; or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms— hereinafter "circuitry". Circuitry is a collection (e.g., set) of circuits implemented in tangible entities that include hardware (e.g., simple circuits, gates, logic, etc.). Circuitry membership can be flexible overtime and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 900 (e.g., the host device 135, the memory device 100, etc.) can include a hardware processor 902 (e.g., a central processing unit (CPU), a graphics processing unit (GPU), a hardware processor core, or any combination thereof, such as the processors 115, etc.), a main memory 904 and a static memory 906, some or all of which can communicate with each other via an interlink (e.g., bus) 908. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a mass storage device (e.g., drive unit) 921, a signal generation device 918 (e.g., a speaker), a network interface device 920, and one or more sensors 916, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 can include a machine readable medium 922 on which is stored one or more sets of data structures or instructions 924 (e.g., software) embodying or utilized by any one or more of the techniques or functions described herein. The instructions 924 can also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 can constitute the machine readable medium 922.

While the machine readable medium 922 is illustrated as a single medium, the term "machine readable medium" can include a single medium or multiple media (e.g., a centralized or distributed database, or associated caches and servers) configured to store the one or more instructions 924.

The term "machine readable medium" can include any medium capable of storing, encoding, or carrying instructions for execution by the machine 900 and that cause the machine 900 to perform any one or more of the techniques of the present disclosure, or capable of storing, encoding or carrying data structures used by or associated with such instructions. Machine readable mediums may include non-transitory machine readable mediums, storage devices, storage mediums, and the like. Non-limiting machine readable medium examples can include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 (e.g., software, programs, an operating system (OS), etc.) or other data are stored on the storage device 921, can be accessed by the main memory 904 for use by the processor 902. The main memory 904 (e.g., DRAM) is typically fast, but volatile, and thus a different type of storage than the storage device 921 (e.g., an SSD), which is suitable for long-term storage, including while in an "off" condition. The instructions 924 or data in use by a user or the machine 900 are typically loaded in the main memory 904 for use by the processor 902. When the main memory 904 is full, virtual space from the storage device 921 can be allocated to supplement the main memory 904; however, because the storage 921 device is typically slower than the main memory 904, and write speeds are typically at least twice as slow as read speeds, use of virtual memory can greatly reduce user experience due to storage device latency (in contrast to the main memory 904, e.g., DRAM). Further, use of the storage device 921 for virtual memory can greatly reduce the usable lifespan of the storage device 921.

In contrast to virtual memory, virtual memory compression (e.g., the Linux® kernel feature "ZRAM") uses part of the memory as compressed block storage to avoid paging to the storage device 921. Paging takes place in the compressed block until it is necessary to write such data to the storage device 921. Virtual memory compression increases the usable size of main memory 904, while reducing wear on the storage device 921.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 924 can further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium capable of storing, encoding or carrying instructions for execution by the machine 900, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, i.e., a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

It will be understood that when an element is referred to as being "on," "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

OTHER NOTES AND EXAMPLES

Example 1 is a memory system comprising: a memory die, the memory die comprising one or more hardware processors configured to perform one or more operations by a set of instructions; a memory controller comprising one or more hardware processors, the memory controller configured to perform operations comprising: determining that an update of the set of instructions on the memory die is indicated; loading an updated set of instructions into a page buffer of the memory die; and causing the memory die to update the set of instructions based upon the updated set of instructions in the page buffer.

In Example 2, the subject matter of Example 1 includes, wherein the operations of determining that the update of the set of instructions on the memory die is indicated comprises determining that a version of the set of instructions on the memory die is older than a version loaded with a firmware update of the memory controller.

In Example 3, the subject matter of Examples 1-2 includes, wherein the operations of loading the updated set of instructions into the page buffer of the memory die comprises: sending a command to the memory die including the updated set of instructions, the command instructing the memory die to store the updated set of instructions in the page buffer.

In Example 4, the subject matter of Examples 1-3 includes, wherein the operations of loading the updated set of instructions into the page buffer of the memory die comprises: sending a write command to the memory die to write the updated set of instructions to a memory array on the memory die; and sending a command to the memory die instructing the memory die to load the updated set of instructions from the memory array on the memory die to the page buffer.

In Example 5, the subject matter of Examples 1-4 includes, wherein the operations of causing the memory die to update the set of instructions based upon the updated set of instructions in the page buffer comprises updating all of the set of instructions of the memory die.

In Example 6, the subject matter of Examples 1-5 includes, wherein the operations of causing the memory die to update the set of instructions based upon the updated set of instructions in the page buffer comprises updating only a portion of the set of instructions of the memory die.

In Example 7, the subject matter of Examples 1-6 includes, wherein the operations of updating only a portion of the set of instructions of the memory die comprises: reading the updated set of instructions to determine an offset; and replacing an instruction at an address of the set of instructions of the memory die with a replacement instruction in the updated set of instructions.

In Example 8, the subject matter of Examples 1-7 includes, wherein the set of instructions are microcode or firmware instructions.

In Example 9, the subject matter of Examples 1-8 includes, wherein the operations of loading an updated set of instructions into a page buffer of the memory die and causing the memory die to update the set of instructions based upon the updated set of instructions in the page buffer are performed after the set of instructions is loaded into a memory of the NAND die and wherein the operations of causing the memory die to update the set of instructions based upon the updated set of instructions in the page buffer comprises: overwriting the set of instructions in the static memory with the updated set of instructions.

In Example 10, the subject matter of Examples 1-9 includes, wherein the operations further comprise: determining that an update of a first value stored in a read only memory on the memory die is indicated; loading an updated first value into a page buffer of the memory die; and causing the memory die to update the first value to the updated first value in the page buffer.

In Example 11, the subject matter of Examples 1-10 includes, wherein the operations of causing the memory die to update the set of instructions based upon the updated set of instructions in the page buffer comprises: overwriting the set of instructions stored in a plurality of latches of the NAND die with the updated set of instructions.

Example 12 is a method of updating instructions for execution on a memory die comprising: at a memory controller, performing operations comprising: determining that an update of a set of instructions that configure a hardware processor on the memory die is indicated; loading an updated set of instructions into a page buffer of the memory die; and causing the memory die to update the set of instructions based upon the updated set of instructions in the page buffer.

In Example 13, the subject matter of Example 12 includes, wherein determining that the update of the set of instructions on the memory die is indicated comprises determining that a version of the set of instructions on the memory die is older than a version loaded with a firmware update of the memory controller.

In Example 14, the subject matter of Examples 12-13 includes, wherein loading the updated set of instructions into the page buffer of the memory die comprises: sending a command to the memory die including the updated set of instructions, the command instructing the memory die to store the updated set of instructions in the page buffer.

In Example 15, the subject matter of Examples 12-14 includes, wherein loading the updated set of instructions into the page buffer of the memory die comprises: sending a write command to the memory die to write the updated set of instructions to a memory array on the memory die; and sending a command to the memory die instructing the memory die to load the updated set of instructions from the memory array on the memory die to the page buffer.

In Example 16, the subject matter of Examples 12-15 includes, wherein causing the memory die to update the set of instructions based upon the updated set of instructions in the page buffer comprises updating all of the set of instructions of the memory die.

In Example 17, the subject matter of Examples 12-16 includes, wherein causing the memory die to update the set of instructions based upon the updated set of instructions in the page buffer comprises updating only a portion of the set of instructions of the memory die.

In Example 18, the subject matter of Examples 12-17 includes, wherein updating only a portion of the set of instructions of the memory die comprises: reading the updated set of instructions to determine an offset; and replacing an instruction at an address of the set of instructions of the memory die with a replacement instruction in the updated set of instructions.

In Example 19, the subject matter of Examples 12-18 includes, wherein the set of instructions are microcode or firmware instructions.

In Example 20, the subject matter of Examples 12-19 includes, wherein loading an updated set of instructions into a page buffer of the memory die and causing the memory die to update the set of instructions based upon the updated set of instructions in the page buffer are performed after the set of instructions is loaded into a memory of the NAND die and wherein causing the memory die to update the set of instructions based upon the updated set of instructions in the page buffer comprises: overwriting the set of instructions in the static memory with the updated set of instructions.

In Example 21, the subject matter of Examples 12-20 includes, wherein the method further comprises: determining that an update of a first value stored in a read only memory on the memory die is indicated; loading an updated first value into a page buffer of the memory die; and causing the memory die to update the first value to the updated first value in the page buffer.

In Example 22, the subject matter of Examples 12-21 includes, wherein causing the memory die to update the set of instructions based upon the updated set of instructions in the page buffer comprises: overwriting the set of instructions stored in a plurality of latches of the NAND die with the updated set of instructions.

Example 23 is a non-transitory machine-readable medium, storing instructions, which when executed by a controller of a memory device, cause the controller to perform operations comprising: determining that an update of a set of instructions that configure a hardware processor on the memory die is indicated; loading an updated set of instructions into a page buffer of the memory die; and causing the memory die to update the set of instructions based upon the updated set of instructions in the page buffer.

In Example 24, the subject matter of Example 23 includes, wherein the operations of determining that the update of the set of instructions on the memory die is indicated comprises determining that a version of the set of instructions on the memory die is older than a version loaded with a firmware update of the memory controller.

In Example 25, the subject matter of Examples 23-24 includes, wherein the operations of loading the updated set of instructions into the page buffer of the memory die comprises: sending a command to the memory die including the updated set of instructions, the command instructing the memory die to store the updated set of instructions in the page buffer.

In Example 26, the subject matter of Examples 23-25 includes, wherein the operations of loading the updated set of instructions into the page buffer of the memory die comprises: sending a write command to the memory die to write the updated set of instructions to a memory array on the memory die; and sending a command to the memory die instructing the memory die to load the updated set of instructions from the memory array on the memory die to the page buffer.

In Example 27, the subject matter of Examples 23-26 includes, wherein the operations of causing the memory die to update the set of instructions based upon the updated set of instructions in the page buffer comprises updating all of the set of instructions of the memory die.

In Example 28, the subject matter of Examples 23-27 includes, wherein the operations of causing the memory die to update the set of instructions based upon the updated set of instructions in the page buffer comprises updating only a portion of the set of instructions of the memory die.

In Example 29, the subject matter of Examples 23-28 includes, wherein the operations of updating only a portion of the set of instructions of the memory die comprises: reading the updated set of instructions to determine an offset; and replacing an instruction at an address of the set of instructions of the memory die with a replacement instruction in the updated set of instructions.

In Example 30, the subject matter of Examples 23-29 includes, wherein the set of instructions are microcode or firmware instructions.

In Example 31, the subject matter of Examples 23-30 includes, wherein the operations of loading an updated set of instructions into a page buffer of the memory die and causing the memory die to update the set of instructions based upon the updated set of instructions in the page buffer are performed after the set of instructions is loaded into a memory of the NAND die and wherein the operations of causing the memory die to update the set of instructions based upon the updated set of instructions in the page buffer comprises: overwriting the set of instructions in the static memory with the updated set of instructions.

In Example 32, the subject matter of Examples 23-31 includes, wherein the operations further comprise: determining that an update of a first value stored in a read only memory on the memory die is indicated; loading an updated first value into a page buffer of the memory die; and causing the memory die to update the first value to the updated first value in the page buffer.

In Example 33, the subject matter of Examples 23-32 includes, wherein the operations of causing the memory die to update the set of instructions based upon the updated set of instructions in the page buffer comprises: overwriting the set of instructions stored in a plurality of latches of the NAND die with the updated set of instructions.

Example 34 is a device for updating instructions for execution on a memory die comprising: means for determining that an update of a set of instructions that configure a hardware processor on the memory die is indicated; means for loading an updated set of instructions into a page buffer of the memory die; and means for causing the memory die to update the set of instructions based upon the updated set of instructions in the page buffer.

In Example 35, the subject matter of Example 34 includes, wherein the means for determining that the update of the set of instructions on the memory die is indicated comprises means for determining that a version of the set of instructions on the memory die is older than a version loaded with a firmware update of the memory controller.

In Example 36, the subject matter of Examples 34-35 includes, wherein the means for loading the updated set of instructions into the page buffer of the memory die comprises: means for sending a command to the memory die including the updated set of instructions, the command instructing the memory die to store the updated set of instructions in the page buffer.

In Example 37, the subject matter of Examples 34-36 includes, wherein the means for loading the updated set of instructions into the page buffer of the memory die comprises: means for sending a write command to the memory die to write the updated set of instructions to a memory array on the memory die; and means for sending a command to the memory die instructing the memory die to load the updated set of instructions from the memory array on the memory die to the page buffer.

In Example 38, the subject matter of Examples 34-37 includes, wherein the means for causing the memory die to update the set of instructions based upon the updated set of instructions in the page buffer comprises means for updating all of the set of instructions of the memory die.

In Example 39, the subject matter of Examples 34-38 includes, wherein the means for causing the memory die to update the set of instructions based upon the updated set of instructions in the page buffer comprises means for updating only a portion of the set of instructions of the memory die.

In Example 40, the subject matter of Examples 34-39 includes, wherein the means for updating only a portion of the set of instructions of the memory die comprises: means for reading the updated set of instructions to determine an offset; and means for replacing an instruction at an address of the set of instructions of the memory die with a replacement instruction in the updated set of instructions.

In Example 41, the subject matter of Examples 34-40 includes, wherein the set of instructions are microcode or firmware instructions.

In Example 42, the subject matter of Examples 34-41 includes, wherein the means for loading an updated set of instructions into a page buffer of the memory die and means for causing the memory die to update the set of instructions based upon the updated set of instructions in the page buffer are performed after the set of instructions is loaded into a memory of the NAND die and wherein the means for causing the memory die to update the set of instructions based upon the updated set of instructions in the page buffer comprises: overwriting the set of instructions in the static memory with the updated set of instructions.

In Example 43, the subject matter of Examples 34-42 includes, means for determining that an update of a first value stored in a read only memory on the memory die is indicated; means for loading an updated first value into a page buffer of the memory die; and means for causing the memory die to update the first value to the updated first value in the page buffer.

In Example 44, the subject matter of Examples 34-43 includes, wherein the means for causing the memory die to update the set of instructions based upon the updated set of instructions in the page buffer comprises: means for overwriting the set of instructions stored in a plurality of latches of the NAND die with the updated set of instructions.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The invention claimed is:

1. A memory system comprising:
   a memory die, the memory die comprising one or more hardware processors configured to perform one or more operations by a set of instructions;
   a memory controller comprising one or more hardware processors, the memory controller configured to perform operations comprising:
      determining that an update of the set of instructions on the memory die is indicated;
      loading an updated set of instructions into a page buffer of the memory die; and
      causing the memory die to update the set of instructions based upon the updated set of instructions in the page buffer.

2. The memory system of claim 1, wherein the operations of determining that the update of the set of instructions on the memory die is indicated comprises determining that a version of the set of instructions on the memory die is older than a version loaded with a firmware update of the memory controller.

3. The memory system of claim 1, wherein the operations of loading the updated set of instructions into the page buffer of the memory die comprises:
sending a command to the memory die including the updated set of instructions, the command instructing the memory die to store the updated set of instructions in the page buffer.

4. The memory system of claim 1, wherein the operations of loading the updated set of instructions into the page buffer of the memory die comprises:
sending a write command to the memory die to write the updated set of instructions to a memory array on the memory die; and
sending a command to the memory die instructing the memory die to load the updated set of instructions from the memory array on the memory die to the page buffer.

5. The memory system of claim 1, wherein the operations of causing the memory die to update the set of instructions based upon the updated set of instructions in the page buffer comprises updating all of the set of instructions of the memory die.

6. The memory system of claim 1, wherein the operations of causing the memory die to update the set of instructions based upon the updated set of instructions in the page buffer comprises updating only a portion of the set of instructions of the memory die.

7. The memory system of claim 1, wherein the operations of updating only a portion of the set of instructions of the memory die comprises:
reading the updated set of instructions to determine an offset; and
replacing an instruction at an address of the set of instructions of the memory die with a replacement instruction in the updated set of instructions.

8. The memory system of claim 1, wherein the set of instructions are microcode or firmware instructions.

9. The memory system of claim 1, wherein the operations of loading an updated set of instructions into a page buffer of the memory die and causing the memory die to update the set of instructions based upon the updated set of instructions in the page buffer are performed after the set of instructions is loaded into a memory of the NAND die and wherein the operations of causing the memory die to update the set of instructions based upon the updated set of instructions in the page buffer comprises:
overwriting the set of instructions in the static memory with the updated set of instructions.

10. The memory system of claim 1, wherein the operations further comprise:
determining that an update of a first value stored in a read only memory on the memory die is indicated;
loading an updated first value into a page buffer of the memory die; and
causing the memory die to update the first value to the updated first value in the page buffer.

11. The memory system of claim 1, wherein the operations of causing the memory die to update the set of instructions based upon the updated set of instructions in the page buffer comprises:
overwriting the set of instructions stored in a plurality of latches of the NAND die with the updated set of instructions.

12. A method of updating instructions for execution on a memory die comprising:
at a memory controller, performing operations comprising:
determining that an update of a set of instructions that configure a hardware processor on the memory die is indicated;
loading an updated set of instructions into a page buffer of the memory die; and
causing the memory die to update the set of instructions based upon the updated set of instructions in the page buffer.

13. The method of claim 12, wherein determining that the update of the set of instructions on the memory die is indicated comprises determining that a version of the set of instructions on the memory die is older than a version loaded with a firmware update of the memory controller.

14. The method of claim 12, wherein loading the updated set of instructions into the page buffer of the memory die comprises:
sending a command to the memory die including the updated set of instructions, the command instructing the memory die to store the updated set of instructions in the page buffer.

15. The method of claim 12, wherein loading the updated set of instructions into the page buffer of the memory die comprises:
sending a write command to the memory die to write the updated set of instructions to a memory array on the memory die; and
sending a command to the memory die instructing the memory die to load the updated set of instructions from the memory array on the memory die to the page buffer.

16. The method of claim 12, wherein causing the memory die to update the set of instructions based upon the updated set of instructions in the page buffer comprises updating only a portion of the set of instructions of the memory die.

17. The method of claim 12, wherein loading an updated set of instructions into a page buffer of the memory die and causing the memory die to update the set of instructions based upon the updated set of instructions in the page buffer are performed after the set of instructions is loaded into a memory of the NAND die and wherein causing the memory die to update the set of instructions based upon the updated set of instructions in the page buffer comprises:
overwriting the set of instructions in the static memory with the updated set of instructions.

18. A non-transitory machine-readable medium, storing instructions, which when executed by a controller of a memory device, cause the controller to perform operations comprising:
determining that an update of a set of instructions that configure a hardware processor on the memory die is indicated;
loading an updated set of instructions into a page buffer of the memory die; and
causing the memory die to update the set of instructions based upon the updated set of instructions in the page buffer.

19. The non-transitory machine-readable medium of claim 18, wherein the operations of determining that the update of the set of instructions on the memory die is indicated comprises determining that a version of the set of instructions on the memory die is older than a version loaded with a firmware update of the memory controller.

20. The non-transitory machine-readable medium of claim 18, wherein the operations of loading the updated set of instructions into the page buffer of the memory die comprises:
   sending a command to the memory die including the updated set of instructions, the command instructing the memory die to store the updated set of instructions in the page buffer.

* * * * *